United States Patent [19]
Manez et al.

[11] Patent Number: 5,919,502
[45] Date of Patent: Jul. 6, 1999

[54] COMPOUND LIQUOR

[75] Inventors: Angel Manez, Marines, Spain; David Barfuss, Worthington, Ohio

[73] Assignee: Nestec S.A., Vevey, Switzerland

[21] Appl. No.: 09/102,217

[22] Filed: Jun. 22, 1998

[51] Int. Cl.⁶ ................................................. A23G 1/00
[52] U.S. Cl. ......................... 426/93; 426/631; 426/466
[58] Field of Search ............................ 426/593, 631, 426/660, 466, 93, 417

[56] References Cited

U.S. PATENT DOCUMENTS

| | | | |
|---|---|---|---|
| 3,707,382 | 12/1972 | Rostagno | 426/593 |
| 3,904,777 | 9/1975 | Goerling et al. | 426/631 |
| 3,923,847 | 12/1975 | Roselius et al. | 260/412.8 |
| 3,955,489 | 5/1976 | Goerling et al. | 99/485 |
| 4,078,093 | 3/1978 | Girsh | 426/593 |
| 4,191,786 | 3/1980 | Nappen et al. | 426/593 |
| 4,224,354 | 9/1980 | Szegvari | 426/584 |
| 4,440,797 | 4/1984 | Berkes et al. | 426/613 |
| 4,758,444 | 7/1988 | Terauchi et al. | 426/593 |
| 5,156,878 | 10/1992 | Tadema | 426/631 |
| 5,252,349 | 10/1993 | Carter, Jr. | 426/482 |
| 5,635,183 | 6/1997 | Takemori et al. | 424/195.1 |

FOREIGN PATENT DOCUMENTS

| | | |
|---|---|---|
| 3740226 | 6/1989 | Germany . |
| 55135546 | 4/1979 | Japan . |
| 58193651 | 5/1982 | Japan . |
| 306828 | 5/1970 | Sweden . |

OTHER PUBLICATIONS

Beckett 1994 Industrial Chocolate Manufacture and Use Blackie Academic & Professional New York pp. 64–69, 76, 391–393.

Memfie 1989 Chocolate, Cocoa and Confectionery: Science and Technology 3rd edition Chapman & Hall, New York pp. 35–61.

*Primary Examiner*—Carolyn Paden
*Attorney, Agent, or Firm*—Pennie & Edmonds LLP

[57] ABSTRACT

A process for the production of a compound liquor suitable for making compound coatings and alternatives to chocolate which comprises mixing a cocoa powder which has been obtained from cocoa beans without any roasting treatment with a confectionery fat and roasting the mixture of cocoa powder and confectionery fat to produce the compound liquor.

18 Claims, No Drawings

COMPOUND LIQUOR

The present invention relates to a process for the production of a compound liquor suitable for making compound coatings or alternatives to chocolate.

BACKGROUND OF THE INVENTION

Compound coatings are well known to those skilled in the art (see Chocolate, Cocoa, and Confectionery; Third Edition, 1989, Bernard W. Minifie; AVI), pp165–182). They are traditionally produced by pressing hot chocolate liquor (produced by roasting cocoa beans, cooling, winnowing to form the nibs and grinding the nibs to form the liquor containing from about 50 to 60% cocoa butter) using hydraulic pressure to extract the cocoa butter and form a cocoa press cake, pulverizing the cocoa press cake to cocoa powder and adding a compound coating fat or confectionery fat to form the cocoa liquor substitute (also known as compound liquor) which is used along with sweeteners and other ingredients to make the compound coating. Compound coating fats or confectionery fats are, for example, cocoa butter alternatives which include vegetable fats such as cocoa butter equivalents (CBE) or cocoa butter substitutes (CBS) which are well known to those skilled in the art, e.g. CBS laurics and CBS nonlaurics (see Chocolate, Cocoa, and Confectionery; Third Edition, 1989, Bernard W. Minifie; AVI, pp100–109).

In this invention the term "compound liquor" is meant to denote cocoa liquor substitute which may be used to make compound coatings or alternatives to chocolate. The term "confectionery fat" is meant to denote compound coating fats.

A major problem with the traditional process for producing compound liquor is that when the cocoa butter is pressed from the hot chocolate liquor, some of the fat soluble chocolate flavor compounds are removed along with it. In addition, further flavor losses occur when the cocoa press cake is pulverized into cocoa powder since there is a high airflow over the product during this step.

We have devised a process for producing a compound liquor which has a better chocolate flavor and aroma than that produced in the traditional process. This involves mixing a cocoa powder which has been obtained from cocoa beans without any roasting treatment with a confectionery fat and roasting the mixture of cocoa powder and confectionery fat to produce the compound liquor.

SUMMARY OF THE INVENTION

According to the present invention there is provided a process for the production of a compound liquor suitable for making compound coatings and alternatives to chocolate which comprises mixing a cocoa powder which has been obtained from cocoa beans without any roasting treatment with a confectionery fat and roasting the mixture of cocoa powder and confectionery fat to produce the compound liquor.

DETAILED DESCRIPTION OF THE INVENTION

In a first embodiment of the invention, the cocoa powder may be obtained by crushing and winnowing cocoa beans to remove shells and form nibs, grinding the unroasted cocoa nibs to form a chocolate liquor containing from about 50 to 60% cocoa butter, pressing the chocolate liquor to extract cocoa butter and form a pressed cocoa cake, and pulverising the pressed cocoa cake to the cocoa powder. By obtaining the cocoa powder in this way without roasting, the water soluble flavor precursors such as sugars, peptides and amino acids remain in the non-fat fraction. When the mixture of cocoa powder and confectionery fat is roasted to produce the compound liquor, the aroma compounds generated during roasting are trapped in the confectionery fat.

The crushing, winnowing, grinding and pressing and pulverisation of the pressed cocoa cake may be carried out by conventional methods. If desired, the cocoa beans may be heated to a temperature below that at which a roast flavor would be formed, e.g. not more than 100° C., before or during crushing and winnowing. Treatments of the raw beans or nibs typically used in the industry for nib roasting may be used to loosen the shells or reduce microbial load before winnowing and grinding. The pressing of the chocolate liquor to extract cocoa butter and form a pressed cocoa cake may be carried out conventionally in a hydraulic press at a temperature below that at which a roast flavor would be formed, e.g. up to 100° C., such as from 90° to 98° C. until the required residual fat is obtained (usually from 10 to 20% by weight). If desired, alkalisation may be carried out, e.g. of the nibs or chocolate liquor, by conventional methods, for instance, by treating with solutions or suspensions of alkali, usually sodium or potassium carbonate.

In a second embodiment of the invention, the cocoa powder may be a commercially obtained unroasted cocoa powder with the desired characteristics. Expeller processed cocoa powder which has been solvent extracted is especially suitable when a very low fat cocoa powder is required. This cocoa powder may be made from whole cocoa beans, including shells, if desired. For example, whole raw cocoa beans may be fed into an expeller to remove cocoa butter and produce a cocoa cake containing a reduced amount of cocoa butter, extracting the residual cocoa butter by means of an organic solvent to produce a substantially fat-free cocoa cake, and pulverising the cocoa cake into the cocoa powder. The use of expeller processed cocoa powder gives the following additional advantages:

a) By using an expeller, whole raw beans can be used as the feed which eliminates the need for processing steps such as crushing, winnowing, liquor grinding and pressing leading to significantly reduced costs, b) A higher yield is obtained since the shell is not removed, and c) the cocoa powder is almost completely free of cocoa butter and, therefore, it is compatible with any compound coating fat.

In this second embodiment of the invention, the whole raw beans may first be cleaned to remove dirt such as stones, strings and earth. An anti-pathogen pretreatment of the whole raw cocoa beans is desirable. Before being fed to the expeller press, the beans may be steam treated to soften them and help release the fat in the shearing action. In the expeller press, the whole raw beans are forced into a tapering tube by means of a rotating screw. In one type of expeller press, the tube is perforated along its length by narrow slits and terminates in an adjustable cone that gives a variable gap between the cone and the tube exit. The beans travelling through the press are subjected to a combination of shearing and increasing pressure and the cocoa butter is forced out through the tube slits along the length of the tube. The cocoa cake is extruded through the gap at the end of the expeller press in the form of flakes, known also as cocoa meal or "corns".

The cocoa cake may contain from about 8 to 25% of residual cocoa butter and the residual cocoa butter may be removed by solvent extraction using a fat-soluble organic solvent such as hexane. The resulting fat-free cocoa cake preferably contains less than 1% cocoa butter based on the weight of the cake. The fat-free cocoa cake is then pulverised to a cocoa powder.

If desired, alkali may be added to the cocoa cake or cocoa powder, for instance, by treating 100 parts of cocoa cake or cocoa powder with up to 3 parts of sodium or potassium carbonate solution in water.

The confectionery fat added to the cocoa powder may be a cocoa butter alternative which includes vegetable fats such as cocoa butter equivalents (CBE) or cocoa butter substitutes (CBS) which are well known to those skilled in the art, e.g. CBS laurics and CBS nonlaurics (see Chocolate, Cocoa, and Confectionery; Third Edition, 1989, Bernard W. Minifie; AVI, pp100–109). A particularly preferred example is a lauric blend of fats based on palm kernel oil, the stearines separated from this oil having characteristics similar to cocoa buffer: such an oil blend comprises about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin. These oil blends are described in co-pending U.S. Pat. application Ser. No. 09/050,938.

The amount of confectionery fat added is conveniently the amount sufficient to substantially replace the cocoa butter removed, e.g. from about 30 to 60% by weight, preferably from 40 to 50% by weight based on the total weight of the compound liquor, depending on the amount of cocoa butter removed.

In addition to the confectionery fat, other ingredients may be added to the cocoa powder. Examples of ingredients which impart a "health food" image include carob, soya bean hydrolysate, sorbitol or fructose. Examples of ingredients which act as flavor enhancers are vanilla, essences, fruit juices, sweeteners, and flavor precursors such as reducing sugars or amino acid sources, etc.

The mixture of cocoa powder and confectionery fat may also be roasted by conventional liquor roasting methods, e.g. for a period of from 25 to 50 minutes at a temperature of from 120° to 150° C. to form the compound liquor.

The compound liquor may be used to make coatings for confectionery products such as ice cream, cakes, cookies and biscuits, etc. and used for alternatives to chocolate.

EXAMPLES

The following Examples further illustrate the present invention.

Example 1

Cocoa beans are cleaned to remove dirt (stones, strings, soil, etc.) and then crushed and winnowed to remove germs (about 1%) and shells (12–14%) to form the nibs containing about 55% cocoa butter. The nibs are ground to form the liquor and the liquor is then pressed in a hydraulic press to extract most of the cocoa butter to form the cocoa press cake containing about 15% cocoa butter. A lauric fat blend comprising 13.8% by weight of palm kernel oil, 9.4% by weight of hydrogenated palm kernel oil, 66.5% of palm kernel stearin, and 10.3% by weight of hydrogenated palm kernel stearin in an amount equivalent to the amount of cocoa butter removed from the liquor is added to the cocoa powder and the mixture is roasted at 140° C. for 30 minutes. After cooling, the compound liquor is obtained.

The liquor has an enhanced chocolate flavor and aroma compared with a compound liquor produced by traditional methods.

Example 2

Cocoa beans are cleaned to remove dirt (stones, strings, soil, etc.) and subjected to an anti-pathogen treatment. The treated beans are steam treated and fed to an expeller press where they are forced into a tapering tube by means of a rotating screw. The tube is perforated along its length by narrow slits and terminates in an adjustable cone that gives a variable gap between the cone and the tube exit. The beans travelling through the press are subjected to a combination of shearing and increasing pressure and the cocoa butter is forced out through the tube slits along the length of the tube. The cocoa cake is extruded through the gap at the end of the expeller press in the form of flakes, known also as cocoa meal or "corns".

The cocoa cake contains 15% by weight of residual cocoa butter and the residual cocoa butter is removed by solvent extraction using hexane. The resulting fat-free cocoa cake contains less than 1% cocoa butter based on the weight of the cake. The fat-free cocoa cake is then pulverised to a cocoa powder.

A lauric fat blend comprising 13.8% by weight of palm kernel oil, 9.4% by weight of hydrogenated palm kernel oil, 66.5% of palm kernel stearin, and 10.3% by weight of hydrogenated palm kernel stearin in an amount equivalent to the amount of cocoa butter removed from the liquor is added to the cocoa powder and the mixture is roasted at 140° C. for 30 minutes. After cooling, the compound coating is obtained.

The compound coating has an enhanced chocolate flavor and aroma compared with a compound coating produced by traditional methods.

We claim:

1. A process for the production of a compound liquor suitable for making compound coatings and alternatives to chocolate which comprises mixing a cocoa powder which has been obtained from cocoa beans without any roasting treatment with a confectionery fat and roasting the mixture of cocoa powder and confectionery fat to produce the compound liquor.

2. A process according to claim 1 wherein the cocoa powder is obtained by crushing and winnowing cocoa beans to remove shells and form nibs, grinding the unroasted cocoa nibs to form a chocolate liquor containing from about 50 to 60% cocoa butter, pressing the chocolate liquor to extract cocoa butter and form a pressed cocoa cake, and pulverising the pressed cocoa cake to the cocoa powder.

3. A process according to claim 2 wherein the cocoa beans are heated before or during crushing and winnowing to a temperature below that at which a roast flavor would be formed.

4. A process according to claim 2 wherein the pressing of the chocolate liquor to extract cocoa butter and form a pressed cocoa cake is carried out at a temperature below that at which a roast flavor would be formed.

5. A process according to claim 2 wherein alkali is added to the nibs or chocolate liquor.

6. A process according to claim 5 wherein alkali is added by treating 100 parts of nib or liquor with up to 3 parts of sodium or potassium carbonate solution in water.

7. A process according to claim 1 wherein the cocoa powder is obtained by feeding whole raw cocoa beans into an expeller to remove cocoa butter and produce a cocoa cake containing a reduced amount of cocoa butter, extracting the residual cocoa butter by means of an organic solvent to produce a substantially fat-free cocoa cake, and pulverising the cocoa cake into the cocoa powder.

8. A process according to claim 7 wherein the residual cocoa butter is removed from the cocoa cake by solvent extraction using a fat-soluble organic solvent to give a substantially fat-free cocoa cake.

9. A process according to claim 8 wherein the fat-soluble organic solvent is hexane.

10. A process according to claim 8 wherein the resulting substantially fat-free cocoa cake contains less than 1% cocoa butter based on the weight of the cake.

11. A process according to claim 1 wherein the confectionery fat added to the cocoa powder is a cocoa butter alternative.

12. A process according to claim 1 wherein the confectionery fat is a vegetable fat.

13. A process according to claim 1 wherein the confectionery fat is a cocoa butter equivalent (CBE) or a cocoa butter substitute (CBS).

14. A process according to claim 1 wherein the confectionery fat is an oil blend comprising about 10 to about 16% by weight of palm kernel oil, about 6 to about 12% by weight of hydrogenated palm kernel oil, about 55 to about 75% by weight of palm kernel stearin, and about 7 to about 13% by weight of hydrogenated palm kernel stearin.

15. A process according to claim 1 wherein the amount of confectionery fat added is the amount sufficient to substantially replace the cocoa butter removed.

16. A process according to claim 1 wherein the mixture of cocoa powder and confectionery fat is roasted for a period of from 25 to 50 minutes at a temperature of from 110° to 150° C. to form the compound liquor.

17. A coating containing compound liquor obtainable by a process according to any of the preceding claims.

18. A confectionery product whenever coated with a coating containing compound liquor according to claim 17.

* * * * *